United States Patent
Shumway (10) Patent No.: US 11,319,788 B1
(45) Date of Patent: May 3, 2022

(54) HYDROLYSIS REACTANT FLUIDS FOR PULSE POWER DRILLING

(71) Applicant: Halliburton Energy Services, Inc., Houston, TX (US)

(72) Inventor: William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/111,649

(22) Filed: Dec. 4, 2020

(51) Int. Cl.
| | |
|---|---|
| E21B 43/16 | (2006.01) |
| E21B 43/25 | (2006.01) |
| C09K 8/035 | (2006.01) |
| E21B 4/04 | (2006.01) |
| E21B 10/62 | (2006.01) |
| C09K 8/36 | (2006.01) |

(52) U.S. Cl.
CPC ............ *E21B 43/25* (2013.01); *C09K 8/035* (2013.01); *C09K 8/36* (2013.01); *E21B 4/04* (2013.01); *E21B 10/62* (2013.01); *E21B 43/16* (2013.01)

(58) Field of Classification Search
None
See application file for complete search history.

(56) References Cited

U.S. PATENT DOCUMENTS

| | | | |
|---|---|---|---|
| 6,216,361 B1 | 4/2001 | Smith et al. | |
| 9,190,190 B1 | 11/2015 | Moeny | |
| 10,316,237 B2 | 6/2019 | Van Slyke et al. | |
| 10,435,610 B2 | 10/2019 | Van Slyke et al. | |
| 10,557,072 B2 | 2/2020 | McDaniel et al. | |
| 10,557,073 B2 | 2/2020 | Van Slyke et al. | |
| 10,738,549 B1 | 8/2020 | Jamison et al. | |
| 2004/0082483 A1* | 4/2004 | Muller | C09K 8/36 507/100 |
| 2008/0318812 A1* | 12/2008 | Kakadjian, Sr. | C09K 8/20 507/221 |
| 2010/0258307 A1* | 10/2010 | Muller | C09K 8/18 166/267 |
| 2013/0267444 A1* | 10/2013 | Thaemlitz | E21B 43/025 507/117 |
| 2017/0073565 A1 | 3/2017 | Mcdaniel et al. | |
| 2017/0362490 A1 | 12/2017 | Van Slyke et al. | |
| 2017/0369760 A1* | 12/2017 | Pober | C09K 8/36 |

FOREIGN PATENT DOCUMENTS

| | | |
|---|---|---|
| WO | 2015171334 | 11/2015 |
| WO | 2019139576 | 7/2019 |

OTHER PUBLICATIONS

U.S. Appl. No. 17/008,176, filed Aug. 31, 2020.

* cited by examiner

*Primary Examiner* — Silvana C Runyan
(74) *Attorney, Agent, or Firm* — Tenley Krueger; C. Tumey Law Group PLLC (57) ABSTRACT

A method of pulse power drilling in a subterranean formation may comprise providing a drilling fluid comprising an oil external phase, an internal phase, and a hydrolysis reactant compound for reaction with water. The method may also comprise passing an electric current through the subterranean formation to extend a wellbore in the subterranean formation while circulating the drilling fluid through the wellbore.

20 Claims, 2 Drawing Sheets

HYDROLYSIS REACTANT FLUIDS FOR PULSE POWER DRILLING

Pulse power drilling in subterranean formations involves using a drill bit on which, for example, one or more sets or pairs of electrodes are disposed. The pairs of electrodes may be oriented along a face of the drill bit and disposed with a gap between each electrode in a set. In other words, the electrodes between which an electrical current pass through a mineral substrate (e.g., rock) are not on opposite sides of the rock. The passage of the electrical current between the electrodes of a set and through the rock causes it to break up. This process causes the rock to be broken up into monomineralic grains. The process generally results in the faster generation of more and finer monomineralic grains than with purely mechanical drilling processes.

In conventional rotary bit drilling, a drilling fluid is used, among other purposes, as a lubricant for the rotary drill bit and to carry drill cuttings. Pulse power drilling, on the other hand, uses fundamentally different technology than rotary bit drilling to break apart rock and the drilling fluid used in pulse power drilling may serve other functions. Pulse power drilling fluid may be pumped through the downhole tool at the bottom of the wellbore being drilled and up through the annulus between the drill string and the wellbore. As with rotary bit drilling, the pulse power drilling fluid may bring drill cuttings upward through the annulus and may provide a hydrostatic head to prevent a blowout. During pulse power drilling, it may be advantageous to use an insulating liquid that has a high relative permittivity (dielectric constant) to shift the electric fields away from the liquid and into the rock in the region of the electrodes. However, the insulating drilling fluid should also provide high dielectric strength for high electric fields at the electrodes, low conductivity for low leakage current during the delay time from application of the voltage until the arc ignites in the rock, and high relative permittivity to shift a higher proportion of the electric field into the rock near the electrodes. Accordingly, a pulse power drilling fluid will preferably have a high dielectric constant, low conductivity, high dielectric strength, and a long life under industrial or military application environments.

Nonetheless, although pulse power drilling has the potential to dramatically change hard rock drilling due to the accelerated rate of penetration (ROP), when water becomes entrained in a pulse power drilling fluid, for example, when water kicks are encountered or formation water from cuttings become entrained in the drilling fluid, the drilling efficiency may be undesirably reduced or the process halted.

BRIEF DESCRIPTION OF THE DRAWINGS

These drawings illustrate certain aspects of the present disclosure and should not be used to limit or define the disclosure.

DETAILED DESCRIPTION

The present disclosure provides methods and systems for managing water influx in drilling fluids used in pulse power drilling operations. In some embodiments, the present disclosure provides methods and systems for regulating the concentration of water in drilling fluids used in pulse power operations below a threshold concentration for the purpose of maintaining desired electrical properties. It should be noted that the term "pulse power," as used herein, refers to pulsed electrical discharge drilling and demolition (e.g., low-duration, high voltage) by electric pulses.

Pulse power drilling may be used to form wellbores in subterranean rock formations for recovering hydrocarbons, such as oil and gas, from these formations. Pulse power drilling uses pulsed-power technology to repeatedly fracture the rock formation by repeatedly delivering high-energy electrical pulses to the rock formation. The fractured rock may be removed from the vicinity of the pulse power drill bit by drilling fluid. Although drilling fluids used in conventional mechanical drill bit drilling methods also remove fractured rock from the vicinity of the drill bit, thereby allowing drilling to progress downhole, drilling fluids suitable for use with a conventional mechanical drill bit are typically not suitable for use with a pulse power drill bit. Pulse power drilling fluids have a sufficiently high frequency dependent dielectric constant and dielectric strength, and a sufficiently low electrical conductivity to allow a pulse power drill bit to direct an arc of electric current through a portion of the rock in the formation, heating water and other materials in the rock, and causing that rock and surrounding rock to fracture.

The pulse power drilling disclosed herein differs from electro-hydraulic drilling. In electro-hydraulic drilling, the electric current flows through a conducting fluid, wherein the resultant plasma created may cause a rapid rise in pressure, wherein the pressure fractures the rock. Whereas, the pulse power drilling disclosed herein comprises a current flowing through the rock itself, not through conducting fluids.

For a given pulse power drill bit, the dielectric constant and dielectric strength of the drilling fluid may be sufficiently high if electric fields generated by the pulse power drill bit are directed away from the drilling fluid and into the rock formation, the rock formation is fractured, the drilling operation proceeds downhole at least at a set rate, the drilling operation is economically viable, or any combination of these parameters. Typically, a drilling fluid used in a pulse power drilling operation has both sufficient dielectric and electric conductivity properties. However, water influx may be potentially troublesome for pulse power drilling fluids, as pulse power drilling requires maintenance of desirable dielectric properties of a drilling fluid, namely the dielectric constant and conductivity. Water influx may have a significant negative impact on the conductivity of the drilling fluid in a pulsed power drilling process, such that excess water influx may result in ceasing of pulse power drilling operations.

Water provides high relative permittivity, but has high conductivity, creating high electric charge losses. Therefore, water has excellent energy storage properties, but requires extensive deionization to make it sufficiently resistive so that it does not discharge the high voltage components by current leakage through the liquid. In the deionized condition, water is very corrosive and will dissolve many materials, including metals. As a result, water must be continually conditioned to maintain the high resistivity required for high voltage applications. Even when deionized, water still has such sufficient conductivity that it is not suitable for long-duration, pulsed power applications. Water has a low viscosity and a high dielectric strength, but it also has a high electric conductivity, thus potentially limiting its proportional volume in a pulse power drilling fluid or base fluid. The electric conductivity of water further increases if salts are dissolved in the water, a frequent occurrence during drilling. Water additionally has a highly temperature-variable dielectric constant that decreases with temperature and thus which may also limit water's proportional volume in a pulse power drilling base fluid because the pulse power drilling fluid typically experiences high temperatures in the vicinity of the pulse power drill bit.

Thus, while pulsed power drilling has the potential to dramatically change hard rock drilling due to the very fast rate of penetration (ROP) that is possible, when water becomes entrained in a pulsed power drilling fluid, for example, when water kicks are encountered or formation water from cuttings become entrained in the drilling fluid, the drilling efficiency can be undesirably reduced or the process halted.

Drilling fluid for use with pulse power drilling may be distinct from conventional rotary drilling fluids, and in particular, must provide high dielectric strength to provide high electric fields at the electrodes, low conductivity to provide low leakage current during the delay time from application of the voltage until the arc ignites in the rock, and high relative permittivity to shift a higher proportion of the electric field into the rock near the electrodes. As disclosed herein, the drilling fluid may comprise an oil external phase, an internal phase, and a hydrolysis reactive compound.

The drilling fluid may be formulated to have at least a set dielectric constant, at least a set dielectric strength, less than a set electric conductivity, less than a set viscosity, or any combinations thereof. For example, the drilling fluid may be formulated to have a dielectric constant of about 6 or greater at 100 kHz frequency. Alternatively, the drilling fluid may be formulated to have a dielectric constant of about 7, about 8, about 9, about 10, about 11, about 12, or up to about 16 or greater at 100 kHz frequency. The drilling fluid may be formulated to have a dielectric strength of about 100 kV/cm or greater at 10 microseconds rise time. Alternatively, the drilling fluid may be formulated to have a dielectric constant of at about 130 kV/cm, about least 160 kV/cm, about 190 kV/cm, about 220 kV/cm, about 250 kV/cm, about 280 kV/cm, about 310 kV/cm, or greater at 10 microseconds rise time. The drilling fluid may be formulated may be formulated to have an electric conductivity about $10^{-4}$ mho/cm or less. Alternatively, the drilling may have an electrical conductivity of about $10^{-5}$ mho/cm or less.

In addition to these electrical properties, the drilling fluid may also be formulated with specific viscosity and density requirements. For example, the drilling fluid may be formulated to have a viscosity of about 9 cSt or less at 40° C. Alternatively, the drilling fluid may be formulated to have a viscosity of about 8 cSt, 7 cSt, 6 cSt, or less at 40° C. By way of further example, the drilling fluid may be formulated to have a density of about 8 lb/gal (959 kg/m$^3$) up to about 19 lbs/gal (2277 kg/m$^3$). Alternatively, the drilling fluid may be formulated to have a density of about 8 lb/gal (959 kg/m$^3$) to about 19 lb/gal (2277 kg/m$^3$), about 8.5 lb/gal (1019 kg/m$^3$) to about 16 lb/gal (1917 kg/m$^3$), or about 9 lb/gal (1078 kg/m$^3$) to about 14 lb/gal (1678 kg/m$^3$).

The drilling fluid may comprise an oil external phase. As disclosed herein the oil external phase may comprise a non-conductive base fluid. Suitable non-conductive base fluids include, but are not limited to, a polar oil, a nonpolar oil, or combinations thereof. Polar oil, if present, may include a combination of polar oils. Polar oils tend to have dielectric constants or dielectric strengths that are too low for pulse power drilling. As a result, an alkylene carbonate may be added to the internal phase of the drilling fluid, particularly if it contains a polar oil, to the improve these properties because alkylene carbonates has a high dielectric constant and moderate dielectric strength. However, the amount of alkylene carbonate in the drilling fluid may be limited by its electric conductivity. Butylene carbonate, propylene carbonate, glycerin carbonate, and combinations thereof may also be used.

Polar oils may include a vegetable oil, such as castor oil, an ester oil, such as a polyol ester or monoester oil, or any combination thereof. Polyol ester and monoester oils may provide greater hydrolytic stability, lower viscosity, or both as compared to vegetable oils. A polar oil may include any ester of a carboxylic acid, such as a carboxylic acid with between 8 and 20 carbons, and 0, 1, or 2 moles of unsaturation. The carboxylic acid may be esterified using an alcohol, such as methanol, isopropanol, or 2-ethylhexanol. A polar vegetable oil may include esters of vegetable oils such as esters of palm oil, palm kernel oil, rape seed oil, soybean oil, steric acid, oleic acid, and linoleic acid, and any combinations thereof. A polyol ester oil may include a glycol ester oil, such as a neopentyl glycol diester.

A monoester oil may include hexanyl propanoate and isomers, hexanyl butyrate and isomers, hexanyl hexanoate and isomers, hexanyl octanoate and isomers, hexanyl decanoate and isomers, hexanyl laureate and isomers, hexanyl palmitate and isomers, hexanyl hexadecanoate and isomers, hexanyl stearate and isomers, octanyl propanoate and isomers, octanyl butyrate and isomers, octanyl hexanoate and isomers, octanyl octanoate and isomers, octanyl decanoate and isomers, octanyl laureate and isomers, octanyl palmitate and isomers, octanyl hexadecanoate and isomers, octanyl stearate and isomers, decanyl propanoate and isomers, decanyl butyrate and isomers, decanyl hexanoate and isomers, decanyl octanoate and isomers, decanyl decanoate and isomers, decanyl laureate and isomers, decanyl palmitate and isomers, decanyl hexadecanoate and isomers, decanyl stearate and isomers, dodecanyl propanoate and isomers, dodecanyl butyrate and isomers, dodecanyl hexanoate and isomers, dodecanyl octanoate and isomers, dodecanyl decanoate and isomers, dodecanyl laureate and isomers, dodecanyl palmitate and isomers, dodecanyl hexadecanoate and isomers, dodecanyl stearate and isomers, tetradecanyl propanoate and isomers, tetradecanyl butyrate and isomers, tetradecanyl hexanoate and isomers, tetradecanyl octanoate and isomers, tetradecanyl decanoate and isomers, tetradecanyl laureate and isomers, tetradecanyl palmitate and isomers, tetradecanyl hexadecanoate and isomers, tetradecanyl stearate and isomers, hexadecanyl propanoate and isomers, hexadecanyl butyrate and isomers, hexadecanyl hexanoate and isomers, hexadecanyl octanoate and isomers, hexadecanyl decanoate and isomers, hexadecanyl laureate and isomers, hexadecanyl palmitate and isomers, hexadecanyl hexadecanoate and isomers, hexadecanyl stearate and isomers, octadecanyl propanoate and isomers, octadecanyl butyrate and isomers, octadecanyl hexanoate and isomers, octadecanyl octanoate and isomers, octadecanyl decanoate and isomers, octadecanyl laureate and isomers, octadecanyl palmitate and isomers, octadecanyl hexadecanoate and isomers, octadecanyl stearate and isomers, icosanyl propanoate and isomers, icosanyl butyrate and isomers, icosanyl hexanoate and isomers, icosanyl octanoate and isomers, icosanyl decanoate and isomers, icosanyl laureate and isomers, icosanyl palmitate and isomers, icosanyl hexadecanoate and isomers, icosanyl stearate and isomers, docosanyl propanoate and isomers, docosanyl butyrate and isomers, docosanyl hexanoate and isomers, docosanyl octanoate and isomers, docosanyl decanoate and isomers, docosanyl laureate and isomers, docosanyl palmitate and isomers, docosanyl hexadecanoate and isomers, docosanyl stearate, and any combinations thereof.

Non-polar oils typically have a high dielectric strength and a low electric conductivity. However, as non-polar oils may have a low dielectric constant, they may be included with other components with a higher dielectric constant in the non-conductive base fluid. A non-polar oil suitable for use in a drilling fluid of the present disclosure includes combinations of non-polar oils. Non-polar oils may include, but are not limited to, mineral oils, diesel oils or fuels, paraffin-based oils, oils containing branched and linear aliphatic hydrocarbons having between 8 and 26 carbon atoms and a boiling point in the range of 120° C. to 380° C., oils containing hydrocarbons having between 10 and 16 carbon atoms and a viscosity of 1.5 to 2 cSt at 40° C. Any of the non-polar oils or combinations thereof may have a viscosity of less than 4 cSt at 40° C. In some embodiments, non-polar oils may include an ester of 2-ethylhexanol reacted with palm kernel fatty acid, and an ester of 2-ethylhexanol reacted with $C_6$ to $C_{10}$ fatty acids. Combinations of polar oils and non-polar oils may also be used. The polar oil, non-polar oil, or combination thereof may have a viscosity of less than 4 cSt at 40° C. In some embodiments, other components may include small polar organic molecules, such as aniline or phenol; or high dielectric solids, such as titanium dioxide.

The non-conductive base fluid (e.g., polar oil, non-polar oil, combinations thereof) may be present in the drilling fluid in an any suitable amount as desired for a particular application. For example, the non-conductive base fluid may be present in the drilling fluid in an amount of about 40% to about 80% by volume. Alternatively, the non-conductive base fluid may be present in the drilling fluid in an amount of about 50% to about 75%, about 55% to about 70%, or about 60% to about 65% by volume. Additionally, the drilling fluid may comprise zero or less than 0.1% by weight or volume of polar oil.

The drilling fluid may also comprise an internal phase. Any suitable internal phase may be used, including, but not limited to, a polar alcohol, an amine, an organic carbonate, or combinations thereof. Polar alcohols may include, but are not limited to, —OH alcohols, such as branched and unbranched alcohols with the general formula $C_xH_qOH$, wherein $1 \leq x \leq 18$ and q is a quantity sufficient to render the —OH alcohol electronegative, and any combinations thereof. —$(OH)_2$ alcohols suitable for use in the present disclosure may include branched and unbranched alcohols with the general formula $C_yH_r(OH)_2$, wherein $1 \leq y \leq 18$ and r is a quantity sufficient to render the —$(OH)_2$ alcohol electronegative, and any combinations thereof. Suitable —$(OH)_2$ alcohols particularly include glycols such as ethylene glycol, propylene glycol, butane diol, and any combinations thereof. —$(OH)_3$ alcohols suitable for use in the present disclosure include branched and unbranched alcohols with the general formula $C_zH_r(OH)_3$, wherein $1 \leq z \leq 18$ and r is a quantity sufficient to render the —$(OH)_3$ alcohol electronegative, and any combinations thereof. Suitable —$(OH)_3$ alcohols particularly include glycerin. —OH, —$(OH)_2$, or —$(OH)_3$ alcohols suitable for use in the present disclosure may further include combinations of —OH, —$(OH)_2$, or —$(OH)_3$ alcohols or combinations of —OH, —$(OH)_2$, or —$(OH)_3$ alcohols with other alcohols. Some —OH, —$(OH)_2$, or —$(OH)_3$ alcohols may contain one —OH group per 6 carbons to facilitate solubility. For example, a Cis alcohol may have three —OH groups. The —OH, —$(OH)_2$, or —$(OH)_3$ alcohols may also be at least partially miscible with water. Further, the —OH, —$(OH)_2$, or —$(OH)_3$ alcohols may be able to increase water phase activity of the internal aqueous phase of an invert emulsion. For example, for certain embodiments disclosed herein, the polar alcohol may be glycerin. Glycerin has a high dielectric constant and low electric conductivity, but also low dielectric strength, thus potentially limiting its proportional volume in the drilling fluid or base fluid.

Amines may include saturated or unsaturated amines. Organic carbonates may include, but are not limited to, butylene carbonate dimethyl carbonate, ethylene carbonate, propylene carbonate, triphosgene, glycerin carbonate, and the like, and combinations thereof.

The internal phase may be present in the drilling fluid in an any suitable amount as desired for a particular application. For example, the internal phase may be present in an amount of about 20% to about 50% by volume of the drilling fluid. Alternatively, the internal phase may be present in an amount of about 25% to about 50%, about 28% to about 48%, about 30% to about 46%, about 32% to about 44%, or about 34% to about 42% by volume of the drilling fluid. The internal phase may also comprise water, wherein the maximum water concentration may be less than 10% by volume of the internal phase. Alternatively, the maximum water concentration may be less than 10%, less than 9%, less than 8%, less than 7%, less than 6%, less than 5%, less than 4%, less than 3%, or less than 2% by volume of the internal phase.

As disclosed herein, the drilling fluid may comprise a hydrolysis reactant compound, wherein the hydrolysis reactant compound may effectively remove excess water from the drilling fluid without undesirably changing the overall dielectric character of the drilling fluid. The hydrolysis reactant compound may be added to the drilling fluid while drilling and/or in a mud pit. Alternatively, the drilling fluid may be formulated with the hydrolysis reactant compound and included when delivered to the well site. In some embodiments, one or more electrical properties may be monitored, and additional hydrolysis reactant compound may be added to the drilling fluid until the water is removed below a threshold level of at least less than 20% by volume of the internal phase, and the required electric properties are restored and maintained. Alternatively, the threshold level of water may be at least less than 20%, less than 15%, or less than 10% by volume of the internal phase.

The hydrolysis reactant compounds may include, but are not limited to, esters, wherein the esters may include esters of glycerin, including glyceride, glycerin acetate, glycerol 3-phosphate, glycerol monostearate, glycerophospholipid, glyceryl diacetate, or combinations thereof. The hydrolysis reactant compounds may also include, but are not limited to, methyl acetate, ethyl acetate, ethyl propionate, isopropyl butyrate, calcium oxide, or combinations thereof. As disclosed herein, the hydrolysis reactant compound may be present in the drilling fluid in an amount of about 0.5% to about 10% by volume of drilling fluid. Alternatively, the hydrolysis reactant compound may be present in the drilling fluid in an amount of about 0.5% to about 10%, about 0.75% to about 8%, about 1% to about 6%, or 2% to 4% by volume of drilling fluid.

The drilling fluid may further comprise additional additives, including, but not limited to an emulsifier, a fluid loss control agent (FLCAs), a rheology modifier, lubricants, and loss circulation materials (LCMs). Emulsifiers may include, but are not limited to, polyaminated fatty acids, tall oil fatty acids, including palmitic acid, oleic acid, and linoleic acid, oxidized and modified tall oil fatty acids, rosin acids, including rings with empirical formula $C_{19}H_{29}COOH$, oxidized and modified rosin acids, and other emulsifiers with a hydrophilic lipophilic balance (HLB) between 4 and 10, and any combinations thereof. The emulsifier may be present in the oil external phase in an amount of about 0.1% to about 10% by weight. Alternatively, emulsifier may be present in the oil external phase in an amount of about 0.1% to about 10%, about 1% to about 8%, about 1.5% to about 6%, or about 2% to about 5% by weight. The amount of emulsifier in the oil external phase may particularly depend upon the relative amounts of non-polar oil, —OH, —$(OH)_2$, or —$(OH)_3$ alcohol, and water. —OH, —$(OH)_2$, or —$(OH)_3$ alcohol, such as glycols, are relatively chemically active and thus may react with water in the drilling fluid. However, the emulsifier creates a micelle interphase between the non-polar oil and the polar water. The —OH, —$(OH)_2$, or —$(OH)_3$ alcohol is miscible in the water to form a combined aqueous phase that is emulsified in the continuous non-polar oil phase.

FLCAs may be selected from the group consisting of polyacryloylmorpholine copolymer, a polyvinylpyrrolidone copolymer, and combinations thereof. For example, the polyacryloylmorpholine copolymer may be selected from a group including an acrylic acid and acryloylmorpholine copolymer, a methacrylic acid and acryloylmorpholine copolymer, an acrylamide and acryloylmorpholine copolymer, an N,N-dimethyl acrylamide and acryloylmorpholine copolymer, a 2-acrylamido-2-methylpropane sulfonic acid and acryloylmorpholine copolymer, and combinations thereof. For example, the polyacryloylmorpholine copolymer may be a 2-acrylamido-2-methylpropane sulfonic acid and acryloylmorpholine copolymer, and combinations thereof. For example, the polyvinylpyrrolidone copolymer may be selected from the group of an acrylic acid and vinylpyrrolidone copolymer, a methacrylic acid and vinylpyrrolidone copolymer, an acrylamide and vinylpyrrolidone copolymer, an N,N-dimethyl acrylamide and vinylpyrrolidone copolymer, a 2-acrylamido-2-methylpropane sulfonic acid and vinylpyrrolidone copolymer, and combinations thereof. For example, the polyvinylpyrrolidone copolymer may be a 2-acrylamido-2-methylpropane sulfonic acid and vinylpyrrolidone copolymer.

Alternatively, the FLCAs may be selected from, but not limited to, a dimethyl group, a sulfomethyl group, a sulfonate group, and combinations thereof. The FLCAs may be selected from, but not limited to, the group that includes a graft polymer of 2-acrylamido-2-methylpropane sulfonic acid and acrylamide. The FLCAs may further be selected from, but not limited to, the group that includes polyacrylamide polymers and copolymers, copolymers of 2-Acrylamido-2-methylpropane sulfonic acid and dimethylacrylamide (DMA), polymers of acrylonitrile, isobutylene, acrylamide and 2-acrylamido-2-methylpropane sulfonic acid monomers grafted on lignite, acryloylmorpholine and vinylphosphonic acid copolymers, humic acid grafted polymers, and polymers of polyvinyl alcohol and boric acid, and combinations thereof. FLCAs may be present in an amount of about 0.5% to about 8% by volume of drilling fluid. Alternatively, FLCAs may be present in an amount of about 0.5% to about 8%, about 0.75% to about 6%, or about 1% to about 4% by volume of drilling fluid. In some embodiments comprising synthetic polymer FLCAs, FLCAs may be present in an amount of about 1 pound per barrel ("ppb") (3 kg/m$^3$) to about 8 ppb (23 kg/m$^3$) of drilling fluid. Alternatively, synthetic polymer FLCAs may be present in an amount of about 1 ppb (3 kg/m$^3$) to about 8 ppb (23 kg/m$^3$), about 2 ppb (6 kg/m$^3$) to about 7 ppb (20 kg/m$^3$), about 3 ppb (9 kg/m$^3$) to about 6 ppb (17 kg/m$^3$), or about 4 ppb (11 kg/m$^3$) to about 5 ppb (14 kg/m$^3$) of drilling fluid. In some embodiments comprising modified natural product FLCAs, FLCAs may be present in an amount of about 3 ppb (9 kg/m$^3$) to about 20 ppb (57 kg/m$^3$) of drilling fluid. Alternatively, FLCAs comprising modified natural products may be present in an amount of about 3 ppb (9 kg/m$^3$) to about 20 ppb (57 kg/m$^3$), about 5 ppb (14 kg/m$^3$) to about 18 ppb (51 kg/m$^3$), about 7 ppb (20 kg/m$^3$) to about 16 ppb (46 kg/m$^3$), or about 10 ppb (29 kg/m$^3$) to about 14 ppb (40 kg/m$^3$) of drilling fluid.

Rheology modifiers may be included to change the flow properties of the drilling fluid. Rheology modifiers may, for instance, change the shear properties or viscosity of the drilling fluid. The rheology modifier may be present in the pulse power drilling fluid in an amount sufficient for a particular drilling system, formation, or combination thereof. The type of rheology modifier or combination of rheology modifiers in the pulse power drilling fluid may also be based at least partially upon a particular drilling system, formation, or combination thereof. Rheology modifiers may include thickeners or viscosifiers, such as alkali swellable emulsions, hydrophobically modified alkali swellable emulsion, hydrophobically modified ethoxylated urethane resin, hydroxyethyl cellulose, and nonionic synthetic associative thickener. Rheology modifiers may be present in an amount of about 0.25% to about 4% by volume of drilling fluid. Alternatively, rheology modifiers may be present in an amount of about 0.25% to about 4%, about 0.5% to about 3.5%, about 0.75% to about 3%, or about 1% to about 2% by volume of drilling fluid.

Lubricants may include, but are not limited to, fatty acids, fatty amides and esters, phosphates, sulfurized and/or chlorinated hydrocarbons, and the like, or combinations thereof. Lubricants may be present in an amount of about 3% to about 10% by volume of drilling fluid. Alternatively, lubricants may be present in an amount of about 3% to about 10%, about 4% to about 9%, about 5% to about 8%, or about 6% to about 7% by volume of drilling fluid.

LCMs may include, but are not limited to petroleum coke, graphite, walnut hulls, cedar bark, shredded cane stalks, mineral fiber, mica flakes, cellophane, calcium carbonate, ground rubber, polymeric materials, pieces of plastic, grounded marble, asphaltenes, ground coal, wood, nut hulls, plastic laminates, corncobs, cotton hulls, and combinations thereof. The LCMs may be present in an amount of about 2% to about 10% by volume of drilling fluid. Alternatively, LCMs may be present in an amount of about 3% to about 8%, or about 4% to about 6% by volume of drilling fluid.

The drilling fluid may further comprise one or more electrical additives. It should be noted that one or more electrical additives may change one or more electrical properties of the pulse power drilling base fluid. For instance, an electrical additive may change a dielectric property of the pulse power drilling base fluid. Such additives may include, but may not be limited to, mica in any of its various forms such as muscovite, phlogopite, lepidolite, fluorophlogopite, glass-bonded mica, and biotite, polytetrafluoroethylene, other chemical variants of tetrafluoroethylene, glass or a composition of glass including fused silica and alkali-silicate, polystyrene, polyethylene, diamond, lead zirconate titanate (PZT), sodium chloride crystalline, potassium bromide crystalline, silicone oil, benzene, and any combinations thereof. The electrical additive may be present in the drilling fluid in an amount sufficient for a particular drilling system, formation, or combination thereof.

The drilling fluid may further include additives used in conventional drilling fluids. These additives may provide properties to the pulse power drilling fluid similar to the properties they provide to conventional drilling fluids. Additional additives may include a viscosifier or a thinner, a weighting agent, and the like, and any combinations thereof. Weighting agents may increase the density of the drilling fluid without being dissolved in it. As disclosed herein, weighting agents may include, but are not limited to, barite, hematite, ilmenite, manganese tetraoxide, and any combinations thereof. The weighting agent may be present in the drilling fluid in an amount sufficient for a particular drilling system, formation, or combination thereof. The type of weighting agent or combination of weighting agents in the drilling fluid may also be based at least partially upon a particular drilling system, formation, or combination thereof. Typically, for pulse power drilling operations, the amount of weighing agent present may be equivalent to the amount required to sufficiently maintain the drilling fluid density between 8 lb/gallon and 21 lb/gallon. Other additives may include corrosion inhibitors, defoamers, shale stabilizers, wetting agents, dispersing agents, shale inhibitors, pH-control agents, filtration-control agents, alkalinity sources such as lime and calcium hydroxide, salts, foamers, deflocculants, or any combinations thereof.

The systems, methods, and compositions may include any of the various features disclosed herein, including one or more of the following statements:

Statement 1. A method of pulse power drilling in a subterranean formation may comprise providing a drilling fluid comprising an oil external phase, an internal phase, and a hydrolysis reactant compound for reaction with water; and passing an electric current through the subterranean formation to extend a wellbore in the subterranean formation while circulating the drilling fluid through the wellbore.

Statement 2. The method of statement 1, further comprising: monitoring a water concentration in the drilling fluid, wherein the water concentration has a threshold level; and increasing the concentration of the hydrolysis reactant compound in the drilling fluid when the water concentration exceeds the threshold level.

Statement 3. The method of statement 2, wherein the threshold level of the concentration of water in the drilling fluid is less than 20% by volume of the drilling fluid.

Statement 4. The method of any preceding statement, further comprising monitoring one or more electric properties; and adjusting a concentration of the hydrolysis reactant compound in response.

Statement 5. The method of any preceding statement, wherein the drilling fluid has a dielectric constant of about 6 or greater at 100 kHz frequency; a dielectric strength of about 100 kV/cm or greater at 10 microseconds of rise time; an electric conductivity of about $10^{-4}$ mho/cm or less; and a viscosity of less than 9 cSt at 40° C.

Statement 6. The method of any preceding statement, wherein the oil external phase comprises a non-conductive base fluid, wherein the non-conductive base oil comprises at least one oil selected from the group consisting of a polar oil, a non-polar oil, and combinations thereof.

Statement 7. The method of statement 6, wherein the polar oil is selected from the group consisting of vegetable oil, ester oil, and combinations thereof.

Statement 8. The method of statement 6, wherein the non-polar oil is selected from the group consisting of mineral oil, fuel oil, paraffin-based oil, oils containing branched and linear aliphatic hydrocarbons, and combinations thereof.

Statement 9. The method of statement 6 or 8, wherein the non-polar oil comprises at least one ester selected from the group consisting of an ester of 2-ethylhexanol reacted with palm kernel fatty acid, an ester of 2-ethylhexanol reacted with $C_6$ to $C_{10}$ fatty acids, and combinations thereof.

Statement 10. The method of any preceding statement, wherein the internal phase comprises a polar alcohol, an amine, and an organic carbonate.

Statement 11. The method of any preceding statement, wherein the hydrolysis reactant compound comprises an ester.

Statement 12. The method of any preceding statement, wherein the hydrolysis reactant compound comprises an ester of glycerin.

Statement 13. The method of any preceding statement, wherein the hydrolysis reactant compound comprises calcium oxide.

Statement 14. The method of any preceding statement, wherein hydrolysis reactant compound comprises at least one the ester selected from the group consisting of glyceride, glycerin acetate, glycerol 3-phosphate, glycerol monostearate, glycerophospholipid, glyceryl diacetate, and combinations thereof.

Statement 15. The method of any preceding statement, wherein the hydrolysis reactant compound is present in an amount of about 0.5% to about 10% by volume of drilling fluid.

Statement 16. A method of pulse power drilling in a subterranean formation may comprise: providing a drilling fluid comprising an oil external phase, an internal phase, and a hydrolysis reactant compound for reaction with water; and passing an electric current through the subterranean formation to extend a wellbore in the subterranean formation while circulating the drilling fluid through the wellbore, wherein the oil external phase comprises a non-conductive base fluid comprising a polar oil, a nonpolar oil, or combinations thereof, and is present in an amount of about 40% to about 80% by volume of the drilling fluid; wherein the internal phase comprises a polar alcohol, an amine, an organic carbonate, or combinations thereof, and is present in an amount of about 20% to about 50% by volume of the drilling fluid; wherein the hydrolysis reactant compound comprises an ester of glycerin and is present in an amount of about 1% to about 10% by volume of the drilling fluid; and wherein the drilling fluid has a dielectric constant of about 6 or greater at 100 kHz frequency; a dielectric strength of about 100 kV/cm or greater at 10 microseconds of rise time; an electric conductivity of about $10^{-4}$ mho/cm or less; and a viscosity of less than 9 cSt at 40° C.

Statement 17. The method of statement 16, wherein the ester of glycerin is selected from the group consisting of glyceride, glycerin acetate, glycerol 3-phosphate, glycerol monostearate, glycerophospholipid, glyceryl diacetate, and combinations thereof.

Statement 18. The method of statement 16 or 17, further comprising monitoring the concentration of water in the drilling fluid, wherein the concentration of water has a threshold level; and increasing the concentration of the hydrolysis reactant compound in the drilling fluid when the concentration of water exceeds the threshold level.

Statement 19. A pulse power drilling system may comprise: a drill string; a pulse power drill bit attachable to the drill string, wherein the pulse power drill bit comprises a pair of electrodes for generation of an electric potential across the electrodes; and a drilling fluid for circulation through the drilling string to the pulse power drill bit, wherein the drilling fluid comprises an oil external phase, an internal phase, and a concentration of a hydrolysis reactant compound.

Statement 20. The system of statement 19, wherein the drilling fluid has a dielectric constant of about 6 or greater at 100 kHz frequency; a dielectric strength of about 100 kV/cm or greater at 10 microseconds of rise time; an electric conductivity of about $10^{-4}$ mho/cm or less; and a viscosity of less than 9 cSt at 40° C.

Figure 1:
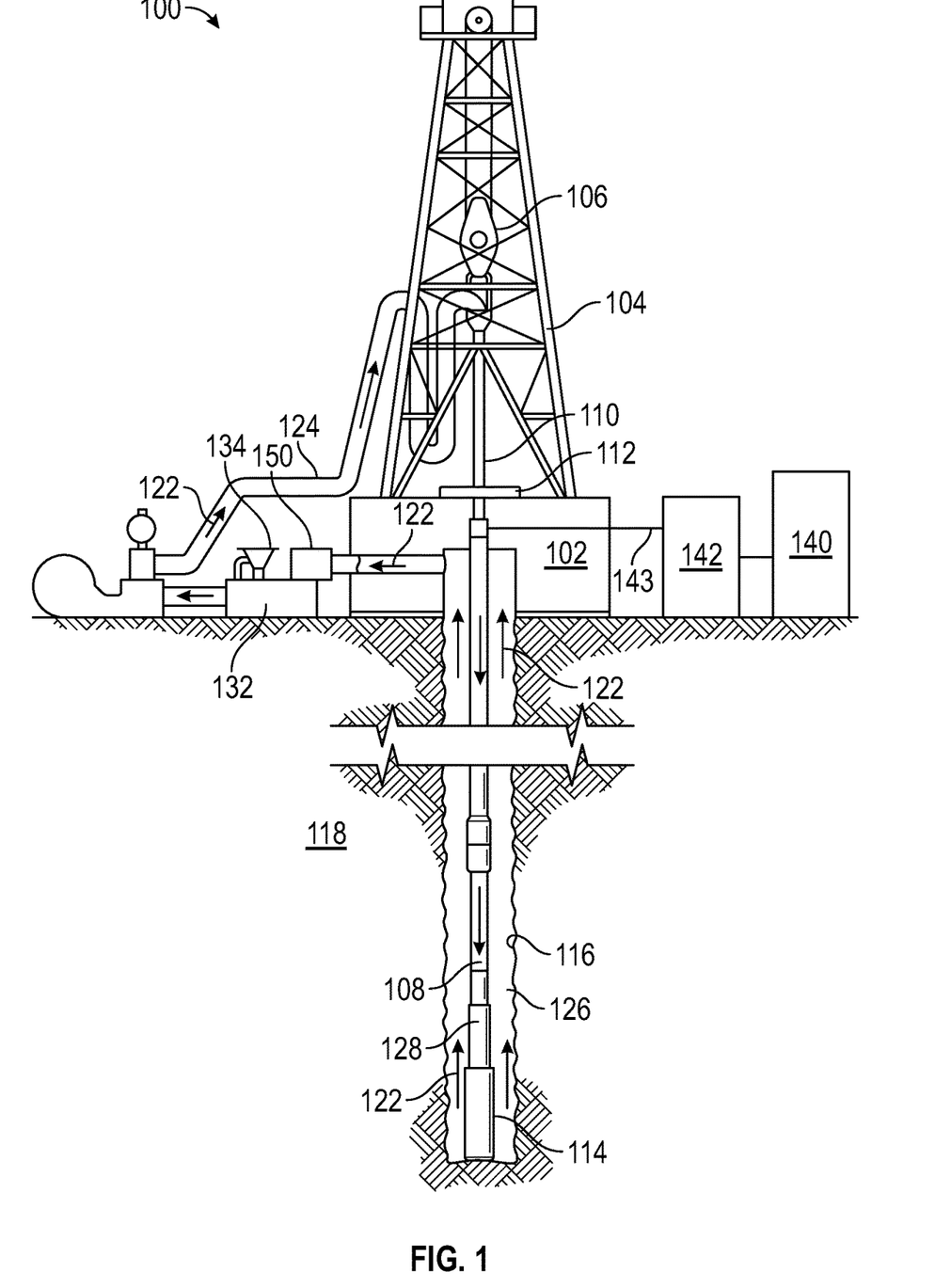
FIG. 1 is an elevation view of an exemplary pulse power drilling system used to form a wellbore in a subterranean formation.

Example methods, systems, and compositions will now be described in more detail with reference to FIGS. 1 and 2. FIG. 1 is an elevation view of an exemplary pulse power drilling system used to form a wellbore in a subterranean formation. Although FIG. 1 shows land-based equipment, downhole tools incorporating teachings of the present disclosure may be satisfactorily used with equipment located on offshore platforms, drill ships, semi-submersibles, and drilling barges (not expressly shown). Additionally, while wellbore 116 is shown as being a generally vertical wellbore, wellbore 116 may be any orientation, including generally horizontal, multilateral, or directional. Drilling system 100 includes drilling platform 102 that supports derrick 104 having traveling block 106 for raising and lowering drill string 108. Drilling system 100 also includes pump 104, which circulates pulse power drilling fluid 122 through feed pipe 124 to kelly 110, which in turn conveys drilling fluid 122 downhole through interior channels of drill string 108 and through one or more orifices in pulse power drill bit 114. Drilling fluid 122 then circulates back to the surface via annulus 126 formed between drill string 108 and the sidewalls of wellbore 116. Typically, during use of drilling system 100, drilling fluid 122 carries fractured rock formed by pulse power drill bit 114 back to the surface with it.

Pulse power drill bit 114 is attached to the distal end of drill string 108. In some embodiments, pulse power drill bit 114 may be supplied power from the surface. For example, generator 140 may generate electrical power and provide that power to power-conditioning unit 142. Power-conditioning unit 142 may then transmit electrical energy downhole via surface cable 143 and a sub-surface cable (not expressly shown in FIG. 1) contained within drill string 108. A pulse-generating circuit within bottom-hole assembly (BHA) 128 may receive the electrical energy from power-conditioning unit 142 and may generate high-energy pulses to drive pulse power drill bit 114. For example, pulsed-power technology may be utilized to repeatedly apply a high electric potential, for example up to or exceeding 150 kV, across the electrodes of pulse power drill bit 114. Each application of electric potential is referred to as a pulse. When the electric potential across the electrodes of pulse power drill bit 114 is increased enough during a pulse to generate a sufficiently high electric field, an electrical arc forms through a rock formation at the bottom of wellbore 116. The arc temporarily forms an electrical coupling between the electrodes, allowing electric current to flow through the arc inside a portion of the rock formation at the bottom of wellbore 116. The arc greatly increases the temperature and pressure of the portion of the rock formation through which the arc flows and the surrounding formation and materials. The temperature and pressure are sufficiently high to break the rock itself onto small bits or cuttings.

As pulse power drill bit 114 repeatedly fractures rock and drilling fluid 122 moves the fractured rock uphole, wellbore 116, which penetrates various subterranean rock formations 118, is created. Wellbore 116 may be any hole drilled into a subterranean formation or series of subterranean formations for the purpose of exploration or extraction of natural resources such as, for example, hydrocarbons, or for the purpose of injection of fluids such as, for example, water, wastewater, brine, or water mixed with other fluids. Additionally, wellbore 116 may be any hole drilled into a subterranean formation or series of subterranean formations for the purpose of geothermal power generation.

Figure 2:
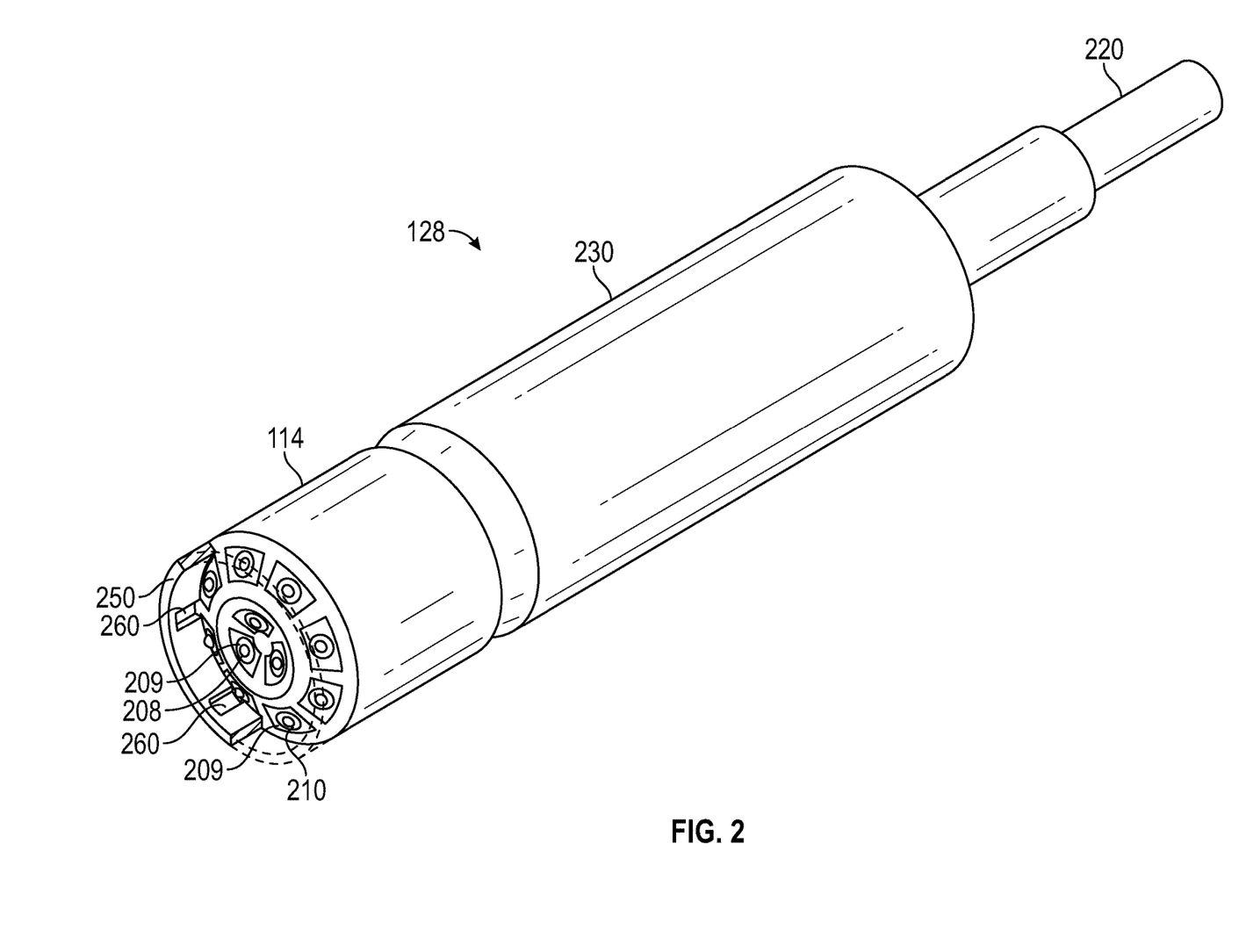
FIG. 2 illustrates exemplary components of a bottom hole assembly for a downhole pulse power drilling system.

FIG. 2 illustrates exemplary components of a bottom hole assembly for downhole pulse power drilling system 100. BHA 128 may include pulsed-power tool 230. BHA 128 may also include pulse power drill bit 114. For the purposes of the present disclosure, pulse power drill bit 114 may be referred to as being integrated within BHA 128 or may be referred to as a separate component that is coupled to BHA 128. Pulsed-power tool 230 may be coupled to provide pulsed power to pulse power drill bit 114. Pulsed-power tool 230 receives electrical energy from a power source via cable 220. For example, pulsed-power tool 230 may receive power via cable 220 from a power source on the surface as described above with reference to FIG. 1, or from a power source located downhole such as a generator powered by a mud turbine. Pulsed-power tool 230 may also receive power via a combination of a power source on the surface and a power source located downhole. Pulsed-power tool 230 converts the electrical energy received from the power source into high-power electrical pulses and may apply those high-power pulses across electrodes of pulse power drill bit 114. For the purposes of the present disclosure, ground ring 250 may also be referred to generally as an electrode or more specifically as a ground electrode. In one example, pulsed-power tool 230 may apply the high-power pulses across electrode 208 and ground ring 250 of pulse power drill bit 114. Pulsed-power tool 230 may also apply high-power pulses across electrode 210 and ground ring 250 in a similar manner as described herein for electrode 208 and ground ring 250.

Pulsed-power tool 230 may include a pulse-generating circuit. Such a pulse-generating circuit may include high-power capacitors which may include fuse-protection. Referring to FIG. 1 and FIG. 2, drilling fluid 122 may exit drill string 108 via openings 209 surrounding each electrode 208 and each electrode 210. The flow of drilling fluid 122 out of openings 209 allows electrodes 208 and 210 to be insulated by the drilling fluid. In some embodiments, pulse power drill bit 114 may include a solid insulator (not expressly shown in FIG. 1 or 2) surrounding electrodes 208 and 210 and one or more orifices (not expressly shown in FIG. 1 or 2) on the face of pulse power drill bit 114 through which drilling fluid 122 may exit drill string 108. Such orifices may be simple holes, or they may be nozzles or other shaped features. Because fines are not typically generated during pulse power drilling, as opposed to mechanical drilling, drilling fluid 122 may not need to exit the drill bit at as high a pressure as the drilling fluid in mechanical drilling. As a result, nozzles and other features used to increase drilling fluid pressure may not be needed. However, nozzles or other features to increase drilling fluid 122 pressure or to direct drilling fluid 122 may be included for some uses.

Drilling fluid 122 is typically circulated through drilling system 100 at a flow rate sufficient to remove fractured rock from the vicinity of pulse power drill bit 114 in sufficient quantities within a sufficient time to allow the drilling operation to proceed downhole at least at a set rate. In addition, drilling fluid 122 may be under sufficient pressure at a location in wellbore 116, particularly a location near a hydrocarbon, gas, water, or other deposit, to prevent a blowout. Electrodes 208 and 210 may be at least 0.4 inches apart from ground ring 250 at their closest spacing, at least 1 inch apart at their closest spacing, at least 1.5 inches apart at their closest spacing, or at least 2 inches apart at their closest spacing. If drilling system 100 experiences vaporization bubbles in drilling fluid 122 near pulse power drill bit 114, the vaporization bubbles may have deleterious effects. For instance, vaporization bubbles near electrodes 208 or 210 may impede formation of the arc in the rock. Drilling fluid 122 may be circulated at a flow rate also sufficient to remove vaporization bubbles from the vicinity of pulse power drill bit 114. In addition, pulse power drill bit 114 may include ground ring 250, shown in part in FIG. 2. Although not all pulse power drill bits 114 may have ground ring 250, if it is present, it may contain passages 260 to permit the flow of drilling fluid 122 along with any fractured rock or bubbles away from electrodes 208 and 210 and uphole.

Referring again to FIG. 1, at the surface, recirculated or spent drilling fluid 122 exits annulus 126. Recirculated or spent drilling fluid 122 may simply be directed back into drill string 108 or may otherwise be processed using only some of the equipment shown in FIG. 1. However, in the drilling system 100, drilling fluid 122 is conveyed to one or more fluid processing units 150 via an interconnecting flow line 130. After passing through fluid processing units 150, cleaned drilling fluid 122 is deposited into retention pit 132. Although fluid processing unit 150 is illustrated in FIG. 1 near the outlet of the wellbore 116, fluid processing unit 150 may be located at a distance from the outlet of wellbore 116. Drilling system 100 may further include mixing hopper 134 communicably coupled to or otherwise in fluidic communication with retention pit 132. Mixing hopper 134 may include, but is not limited to, mixers and related mixing equipment. Mixing hopper 134 may be used to add additives to drilling fluid 122.

Drilling fluid 122 is typically circulated through drilling system 100 at a flow rate sufficient to remove fractured rock from the vicinity of pulse power drill bit 114 in sufficient quantities within a sufficient time to allow the drilling operation to proceed downhole at least at a set rate. In addition, drilling fluid 122 may be under sufficient pressure at a location in wellbore 116, particularly a location near a hydrocarbon, gas, water, or other deposit, to prevent a blowout.

If drilling system 100 experiences cavitation in drilling fluid 122 near pulse power drill bit 112, the cavitation may have various deleterious effects. For instance, cavitation bubbles near electrodes 208 and 210 may impede formation of the arc in the rock. Drilling fluids 122 may be circulated at a flow rate also sufficient to remove cavitation bubbles from the vicinity of pulse power drill bit 114 in sufficient quantities within a sufficient time to allow the drilling operation to proceed downhole at least at a set rate and to avoid damage to drill bit 112 from the cavitation bubbles, for instance damage resulting from the cavitation bubbles reentering drill bit 112.

To limit discharge of the electric field through drilling fluid 122 and allow more electrical current to flow into the rock at the end of wellbore 116, an electrically insulating drilling fluid 122 with a high dielectric constant and a high dielectric strength at a particular operating frequency may be used. An electrically insulating drilling fluid 122 restricts the movement of electrical charges, and therefore, the flow of electrical current through the drilling fluid 122. A high dielectric constant and high dielectric strength decrease electrical discharge through drilling fluid 122. The dielectric constant of the downhole fluid indicates the ability of the drilling fluid to store electrical energy when exposed to an electric field, such as the potential created by pulse power drill bit 114, while the dielectric strength of the downhole fluid indicates a voltage level to which drilling fluid 122 may be exposed before experiencing electrical breakdown, or a loss of its electrically insulating properties.

A method of pulsed power drilling, as disclosed herein, may comprise maintaining a water content of a drilling fluid 122 during drilling, at a location of a pulsed power drill bit 114 within wellbore 116, below the threshold level thereof by utilizing a hydrolysis reactant compound to remove water from the drilling fluid 122, at or near the surface of the wellbore 116, prior to positioning the drilling fluid 122 proximate the location of the pulsed power drill bit 114 within wellbore 116. Accordingly, in some embodiments, the system and method of this disclosure enable the water content of the drilling fluid 122 to be maintained without halting a drilling operation in the wellbore 116. For example, should water enter (water influx) annulus 126 a distance from drill bit 114, the drilling fluid 122 that has been diluted by water migration or water influx into the annulus 126, the hydrolysis reactant compound in the drilling fluid 122 may remove the water therefrom via contacting the drilling fluid 122 with the water in the wellbore 116, whereby the drilling fluid 122 comes into contact with the pulsed power drill bit 114.

Those of ordinary skill in the art will readily appreciate various benefits that may be realized by the present disclosure. For example, the methods and systems disclosed herein may enable real-time adjustment of the water content of a wellbore servicing fluid, such as a drilling fluid, whereby dielectric properties thereof may be maintained within desired ranged for pulse power drilling operations.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The examples disclosed above are illustrative only, as the present embodiments may be modified and practiced in different but equivalent manners apparent to those skilled in the art having the benefit of the teachings herein. Although individual examples are discussed, the present disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of pulse power drilling in a subterranean formation comprising:
providing a drilling fluid comprising an oil external phase, an internal phase, and a hydrolysis reactant compound for reaction with water;
passing an electric current through the subterranean formation to extend a wellbore in the subterranean formation while circulating the drilling fluid through the wellbore; and
monitoring a water concentration in the drilling fluid, wherein the water concentration has a threshold level; and increasing the concentration of the hydrolysis reactant compound in the drilling fluid when the water concentration exceeds the threshold level.

2. The method of claim 1, wherein the threshold level of the concentration of water in the drilling fluid is less than 20% by volume of the drilling fluid.

3. The method of claim 1, further comprising monitoring one or more electric properties; and adjusting a concentration of the hydrolysis reactant compound in response.

4. The method of claim 1, wherein the drilling fluid has a dielectric constant of about 6 or greater at 100 kHz frequency; a dielectric strength of about 100 kV/cm or greater at 10 microseconds of rise time; an electric conductivity of about $10^{-4}$ mho/cm or less; and a viscosity of less than 9 cSt at 40° C.

5. The method of claim 1, wherein the oil external phase comprises a non-conductive base fluid, wherein the non-conductive base oil comprises at least one oil selected from the group consisting of a polar oil, a non-polar oil, and combinations thereof.

6. The method of claim 5, wherein the polar oil is selected from the group consisting of vegetable oil, ester oil, and combinations thereof.

7. The method of claim 5, wherein the non-polar oil is selected from the group consisting of mineral oil, fuel oil, paraffin-based oil, oils containing branched and linear aliphatic hydrocarbons, and combinations thereof.

8. The method of claim 5, wherein the non-polar oil comprises at least one ester selected from the group consisting of an ester of 2-ethylhexanol reacted with palm kernel fatty acid, an ester of 2-ethylhexanol reacted with $C_6$ to $C_{10}$ fatty acids, and combinations thereof.

9. The method of claim 1, wherein the internal phase comprises a polar alcohol, an amine, and an organic carbonate.

10. The method of claim 1, wherein the hydrolysis reactant compound comprises an ester.

11. The method of claim 1, wherein the hydrolysis reactant compound comprises an ester of glycerin.

12. The method of claim 1, wherein the hydrolysis reactant compound comprises calcium oxide.

13. The method of claim 1, wherein hydrolysis reactant compound comprises at least one the ester selected from the group consisting of glyceride, glycerin acetate, glycerol 3-phosphate, glycerol monostearate, glycerophospholipid, glyceryl diacetate, and combinations thereof.

14. The method of claim 1, wherein the hydrolysis reactant compound is present in an amount of about 0.5% to about 10% by volume of drilling fluid.

15. A method of pulse power drilling in a subterranean formation comprising:
providing a drilling fluid comprising an oil external phase, an internal phase, and a hydrolysis reactant compound for reaction with water; and
passing an electric current through the subterranean formation to extend a wellbore in the subterranean formation while circulating the drilling fluid through the wellbore,
wherein the oil external phase comprises a non-conductive base fluid comprising a polar oil, a nonpolar oil, or combinations thereof, and is present in an amount of about 40% to about 80% by volume of the drilling fluid;
wherein the internal phase comprises a polar alcohol, an amine, an organic carbonate, or combinations thereof, and is present in an amount of about 20% to about 50% by volume of the drilling fluid;
wherein the hydrolysis reactant compound comprises an ester of glycerin and is present in an amount of about 1% to about 10% by volume of the drilling fluid;
wherein the drilling fluid has a dielectric constant of about 6 or greater at 100 kHz frequency; a dielectric strength of about 100 kV/cm or greater at 10 microseconds of rise time; an electric conductivity of about $10^{-4}$ mho/cm or less; and a viscosity of less than 9 cSt at 40° C.; and
monitoring a water concentration in the drilling fluid, wherein the water concentration has a threshold level; and increasing the concentration of the hydrolysis reactant compound in the drilling fluid when the water concentration exceeds the threshold level.

16. The method of claim 15, wherein the ester of glycerin is selected from the group consisting of glyceride, glycerin acetate, glycerol 3-phosphate, glycerol monostearate, glycerophospholipid, glyceryl diacetate, and combinations thereof.

17. A pulse power drilling system comprising:
a drill string;
a pulse power drill bit attachable to the drill string, wherein the pulse power drill bit comprises a pair of electrodes for generation of an electric potential across the electrodes;
a drilling fluid for circulation through the drilling string to the pulse power drill bit, wherein the drilling fluid comprises an oil external phase, an internal phase, and a concentration of a hydrolysis reactant compound; and
a fluid processing unit for monitoring a water concentration in the drilling fluid, wherein the water concentration has a threshold level; and the fluid processing unit increases the concentration of the hydrolysis reactant compound in the drilling fluid when the water concentration exceeds the threshold level.

18. The system of claim 17, wherein the drilling fluid has a dielectric constant of about 6 or greater at 100 kHz frequency; a dielectric strength of about 100 kV/cm or greater at 10 microseconds of rise time; an electric conductivity of about $10^{-4}$ mho/cm or less; and a viscosity of less than 9 cSt at 40° C.

19. A method of pulse power drilling in a subterranean formation comprising:
providing a drilling fluid comprising an oil external phase, an internal phase, and a hydrolysis reactant compound for reaction with water;
passing an electric current through the subterranean formation to extend a wellbore in the subterranean formation while circulating the drilling fluid through the wellbore;

monitoring one or more electric properties; and adjusting a concentration of the hydrolysis reactant compound in response.

20. A method of pulse power drilling in a subterranean formation comprising:

providing a drilling fluid comprising an oil external phase, an internal phase, and a hydrolysis reactant compound for reaction with water; wherein the hydrolysis reactant compound comprises calcium oxide; and passing an electric current through the subterranean formation to extend a wellbore in the subterranean formation while circulating the drilling fluid through the wellbore.

\* \* \* \* \*